United States Patent
Annavajjala

(10) Patent No.: US 9,686,102 B2
(45) Date of Patent: Jun. 20, 2017

(54) SPARSE ORDERED ITERATIVE GROUP MULTI-ANTENNA CHANNEL ESTIMATION

(71) Applicant: Altiostar Networks, Inc., Tewksbury, MA (US)

(72) Inventor: Ramesh Annavajjala, Quincy, MA (US)

(73) Assignee: AltioStar Networks, Inc., Tewksbury, MA (US)

( * ) Notice: Subject to any disclaimer, the term of this patent is extended or adjusted under 35 U.S.C. 154(b) by 0 days.

(21) Appl. No.: 14/248,958

(22) Filed: Apr. 9, 2014

(65) Prior Publication Data

US 2015/0295733 A1    Oct. 15, 2015

(51) Int. Cl.
*H04L 27/28* (2006.01)
*H04L 25/02* (2006.01)
*H04L 27/26* (2006.01)
*H04B 7/0413* (2017.01)

(52) U.S. Cl.
CPC ....... *H04L 25/0206* (2013.01); *H04B 7/0413* (2013.01); *H04L 25/0216* (2013.01); *H04L 25/0224* (2013.01); *H04L 25/0228* (2013.01); *H04L 25/0242* (2013.01); *H04L 27/2613* (2013.01); *H04L 27/2675* (2013.01)

(58) Field of Classification Search
CPC .................. H04L 27/2647; H04L 25/03006
USPC ................................................ 375/259, 260
See application file for complete search history.

(56) References Cited

U.S. PATENT DOCUMENTS

| | | |
|---|---|---|
| 2006/0062322 A1 | 3/2006 | Namgoong et al. |
| 2007/0058734 A1* | 3/2007 | Kao et al. ............... 375/260 |
| 2009/0067519 A1* | 3/2009 | Baggen et al. .......... 375/260 |
| 2009/0080555 A1* | 3/2009 | Li ............................ 375/260 |
| 2009/0116589 A1* | 5/2009 | Zhang ............... H04L 1/0003 375/341 |

(Continued)

FOREIGN PATENT DOCUMENTS

GB    2428934 A    2/2007

OTHER PUBLICATIONS

Ilic et al., Sparcity Enhanced Decision Feedback Equalization. Signal Processing, IEEE Transactions. Feb. 28, 2012, 60(5): 2422-32.*

(Continued)

*Primary Examiner* — Kevin M Burd
(74) *Attorney, Agent, or Firm* — Mintz Levin Cohn Ferris Glovsky and Popeo, P.C.

(57) ABSTRACT

Data can be received characterizing a first signal transmitted in an orthogonal frequency-division multiplexing (OFDM) system by a transmitter with one or more transmit antennas through a wireless channel and received by a receiver with a plurality of receive antennas, the first signal including a plurality of pilot pulses. A final estimated channel impulse response of the wireless channel can be determined for each pair of transmitter and receiver antennas by iteratively finding one or more significant delay taps of an intermediate channel impulse response estimate and adding the one or more significant delay taps to an error of the intermediate channel impulse response estimate. Data characterizing the final estimated channel impulse response can be provided. Related apparatus, systems, techniques, and articles are also described.

20 Claims, 16 Drawing Sheets

(56) References Cited

U.S. PATENT DOCUMENTS

| | | | |
|---|---|---|---|
| 2010/0195774 A1* | 8/2010 | Lopez de Victoria | H04B 7/0848 375/343 |
| 2010/0260246 A1* | 10/2010 | Cheong et al. | 375/220 |
| 2012/0033721 A1* | 2/2012 | Isson | H04L 25/03057 375/227 |
| 2013/0121392 A1* | 5/2013 | Thompson | H04L 25/0212 375/227 |

OTHER PUBLICATIONS

Donoho et al., "Sparse Solution of Underdetermined Systems of Linear Equations by Stagewise Orthogonal Matching Pursuit." IEEE Transcations on Information Theory, vol. 58, No. 2. Feb 2012. pp. 1094-1119.*

Ilic et al., Sparsity Enhanced Decision Feedback Equalization. Signal Processing, IEEE Transactions. Feb. 28, 2012;60(5):2422-32.

* cited by examiner

SPARSE ORDERED ITERATIVE GROUP MULTI-ANTENNA CHANNEL ESTIMATION

TECHNICAL FIELD

The subject matter described herein relates to estimation of channel parameters for orthogonal frequency-division multiplexing (OFDM) and single-carrier frequency-domain multiplexing (SC-FDMA) based air interface technologies with one or more antennas at the transmitter and multiple antennas at the receiver.

BACKGROUND

Wireless communication standards such as 2nd generation Global System for Mobile Communications (GSM) based on time-division multiple access (TDMA) and/or frequency-division multiple access (FDMA), 3rd generation systems based on wideband code-division multiple access (WCDMA), and emerging 3rd Generation Partnership Program (3GPP) Long Term Evolution (LTE) systems based on orthogonal frequency-division multiplexing (OFDM) (in the downlink) and single-carrier FDMA (in the uplink), all employ multiple antennas to increase signal reception quality, and to enhance the system coverage. Although GSM systems primarily use multiple receiver antennas for link quality enhancement, 3G-WCDMA and LTE systems use multiple antennas both at the transmitter and the receiver.

Due to constructive and destructive addition of radio waves traveling over the air, the wireless channel between a transmitter antenna and a receiver antenna can be described as a frequency-selective and a time-varying random propagation medium. The frequency-selective nature of the channel produces multiple overlapping signals at the receiver, where each copy of the transmitted signal is attenuated by a random channel gain and delayed by a random time offset. A cyclic-prefix (CP) can be introduced to limit inter-symbol interference caused by channel frequency-selectivity. If CP length is larger than a channel's maximum delay spread, inter-symbol interference can be avoided. Additionally, relative motion between the transmitter and the receiver can introduce Doppler spread to the transmitted signal. For OFDM systems, inter-carrier interference can be avoided if the Doppler spread is smaller than the sub-carrier spacing.

Traditionally, channel estimation for multiple-antennas with OFDM modulation can be performed in two steps. In a first step, using pilot tones, a frequency-domain channel is estimated. In a second step, the frequency-domain channel is interpolated over the pilot tones of interest. This approach is known to yield satisfactory performance if the pilot density is high. With low pilot density, this approach suffers from interpolation errors (e.g., for tones between two given frequency tones), and extrapolation errors (e.g., for data tones beyond the vicinity of the pilot tones).

SUMMARY

In an aspect, data can be received characterizing a first signal transmitted in an orthogonal frequency-division multiplexing (OFDM) system by a transmitter with one or more transmit antennas through a wireless channel and received by a receiver with a plurality of receive antennas, the first signal including a plurality of pilot pulses. A final estimated channel impulse response of the wireless channel can be determined for each pair of transmitter and receiver antennas by iteratively finding one or more significant delay taps of an intermediate channel impulse response estimate and adding the one or more significant delay taps to an error of the intermediate channel impulse response estimate. Data characterizing the final estimated channel impulse response can be provided.

One or more of the following features can be included. For example, the one or more significant delay taps can be non-zero entries of the intermediate channel impulse response estimate. An estimate of a channel frequency response can be determined for a plurality of sub-carriers. An estimate of a length of a channel impulse response of the wireless channel can be determined. One or more of a maximum delay spread of the wireless channel, a minimum delay spread of the wireless channel, an average delay spread of the wireless channel, and a root-mean-square delay of the wireless channel can be determined for each of the one or more transmit antennas. An estimate of a channel coherence bandwidth can be determined for each of the one or more transmit antennas. Iteratively finding significant delay taps of the intermediate channel impulse response estimate and adding the one or more significant delay taps to the error of the intermediate channel impulse response estimate can be performed according to $$\hat{H}_k = \mu(\tilde{H}_0 - G\tilde{H}_{k-1}) + \tilde{H}_{k-1}$$

$$[\text{MaxVal}, Idx] = \max\left(\sum_{m=1}^{M} |\hat{H}_k(0, m)|^2, \ldots, \sum_{m=1}^{M} |\hat{H}_k(N_{CP}, m)|^2\right)$$

$$\tilde{H}_k = \text{zeros}(N_{CP} + 1, M)$$

$$\tilde{H}_k(Idx, m) = \hat{H}_k(Idx, m) \; m = 1, 2, \ldots, M$$

$$k = 1, 2, \ldots, N_{iter}$$

where M is a number of receive antennas; and G, $N_{iter}$, $N_{CP}$, and μ are predetermined.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Like reference symbols in the various drawings indicate like elements.

DETAILED DESCRIPTION

A Sparse Ordered Iterative Group Multi-Antenna Channel Estimation (SOI-MA-CE) scheme is described, which can be used to estimate channel characteristics (e.g., a channel response) between a transmitter with one or more antennas and a receiver equipped with multiple receiver antennas. SOI-MA-CE can iteratively estimate channel characteristics by, for example, iteratively finding significant (e.g., non-zero) delay taps of a channel estimate and adding the significant delay taps to an error measure of the channel estimate to form a sparse ordered channel estimate. The SOI-MA-CE scheme can iteratively process the sparse ordered channel estimate by finding significant delay taps until a predetermined number of iterations have occurred or another stopping criterion is satisfied.

Figure 1:
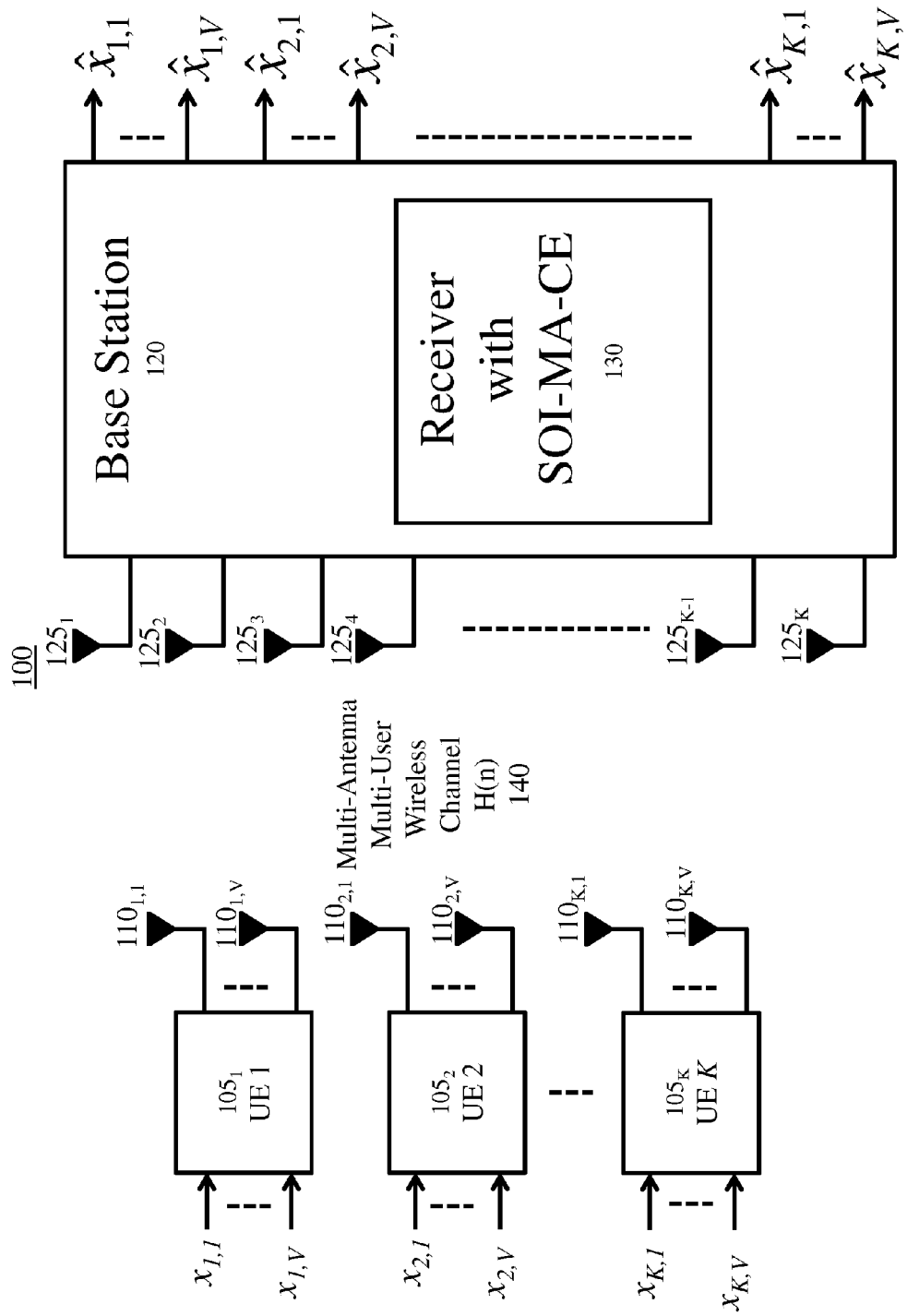
FIG. 1 is a system diagram illustrating an example Multi-User Equipment Multi-stream spatial-division multiple access system with a receiver with Sparse Ordered Iterative Multi Antenna Channel Estimation (SOI-MA-CE) located at a base station.

SOI-MA-CE can be implemented in a number of systems including at a base station or at user equipment (UE). For example, FIG. 1 is a system diagram illustrating an example Multi-UE Multi-stream spatial-division multiple access (SDMA) system 100 (or MU-MIMO) with a receiver with SOI-MA-CE 130 located at a base station 120. The system 100 includes multiple UEs ($105_1$, $105_2$, ..., $105_k$), each having multiple transmit antennas ($110_{1,1}$, $110_{1,2}$, ..., $110_{1,v}$), which communicate with the base station 120 having multiple receive antennas ($125_1$, $125_2$, ..., $125_k$) via the wireless channel 140 (also denoted as H(n)). While FIG. 1 illustrates that the number of antennas on each UE 105 and the number of the antennas on the base station 120 are equal, the number of antennas on either the UE 105 and/or base station 120 can vary. In some example implementations, the number of streams per UE does not exceed the number of transmit antennas at that UE, and the total number of streams (summed across all the UEs) does not exceed the number of receive antennas at the base station.

Figure 2:
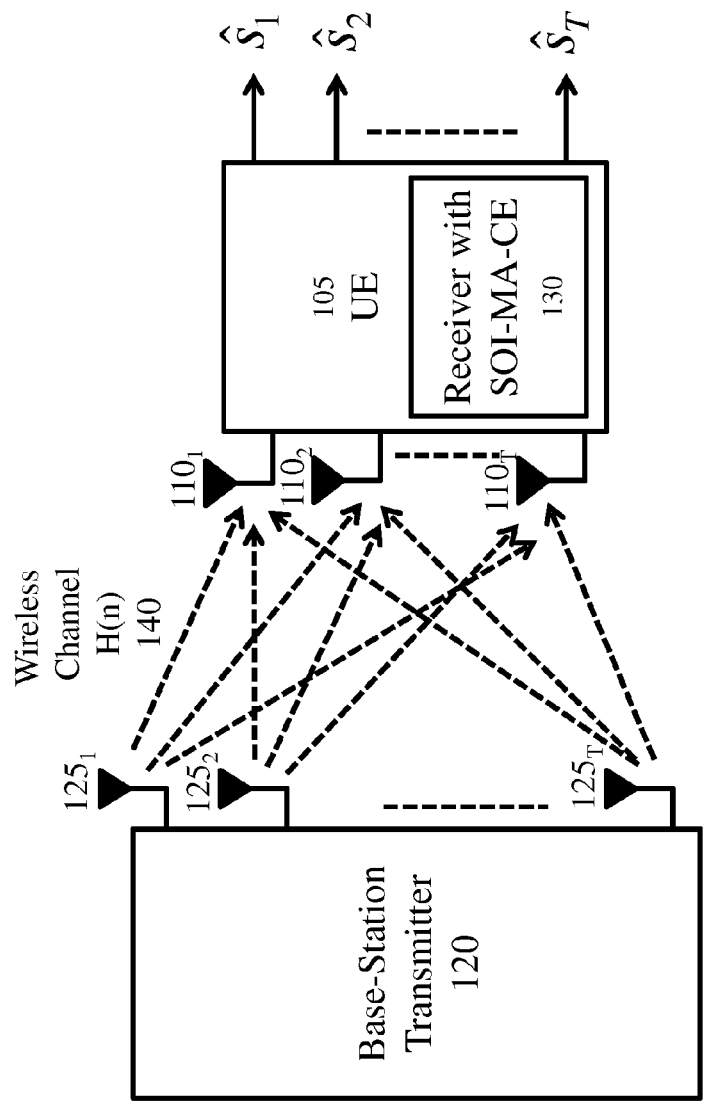
FIG. 2 is a system diagram illustrating a base station transmitter and a User Equipment (UE) with a receiver with SOI-MA-CE.

As a second example, FIG. 2 is a system diagram illustrating a base station 120 transmitter and a UE 105 with a receiver with SOI-MA-CE 130. As described herein, the receiver with SOI-MA-CE 130 can operate either in the uplink or downlink.

Figure 3:
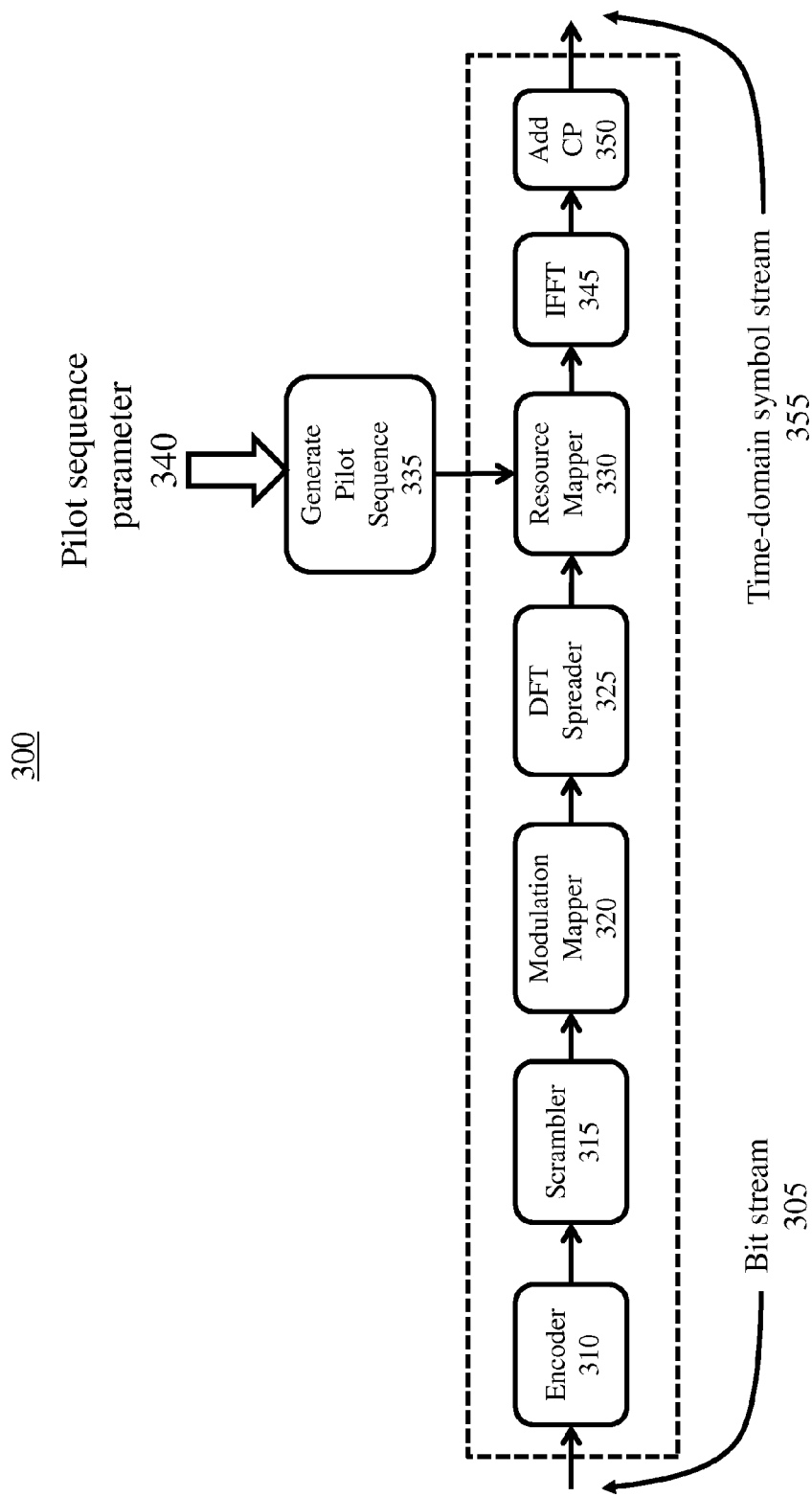
FIG. 3 is a functional block diagram of an example uplink transmitter signal chain within a UE for a single data stream.

FIG. 3 is a functional block diagram of an example uplink transmitter signal chain 300 within a UE 105 for a single data stream (e.g., a single data stream of the system configured as shown in FIG. 1). An information bit stream 305 can be passed through an encoder block 310. The coded bit stream at the output of the encoder can be scrambled at 315, and the scrambled sequence can be modulation mapped at 320 using a constellation such as BPSK, QPSK, or any higher order constellation. To maintain low peak-to-average power ratio, the modulation symbols can be DFT precoded at 325. The precoded complex-valued symbols can be mapped to a set of resource elements (REs) at 330. One RE can be a frequency tone associated with an OFDM symbol (when DFT precoding is applied, the symbol can also be referred to as an SC-FDMA symbol). Separately, a pilot sequence can generated at 335 using pilot sequence parameters 340. Pilot symbols of the generated pilot sequence can be multiplexed with modulation symbols in the Resource Mapper 330 before applying an inverse FFT (IFFT) at 345 to convert the frequency-domain symbols into a time-domain symbol stream 355. To minimize the inter-symbol interference (ISI) caused by the channel frequency-selectivity, a cyclic prefix can be added to the OFDM/SC-FDMA symbol at 350. The length of CP can be larger than the maximum expected channel delay to reduce or eliminate the ISI completely. The time-domain symbol stream 355 can be further processed and transmitted over the wireless channel (H(n)) 140 to the base station 120.

Figure 4:
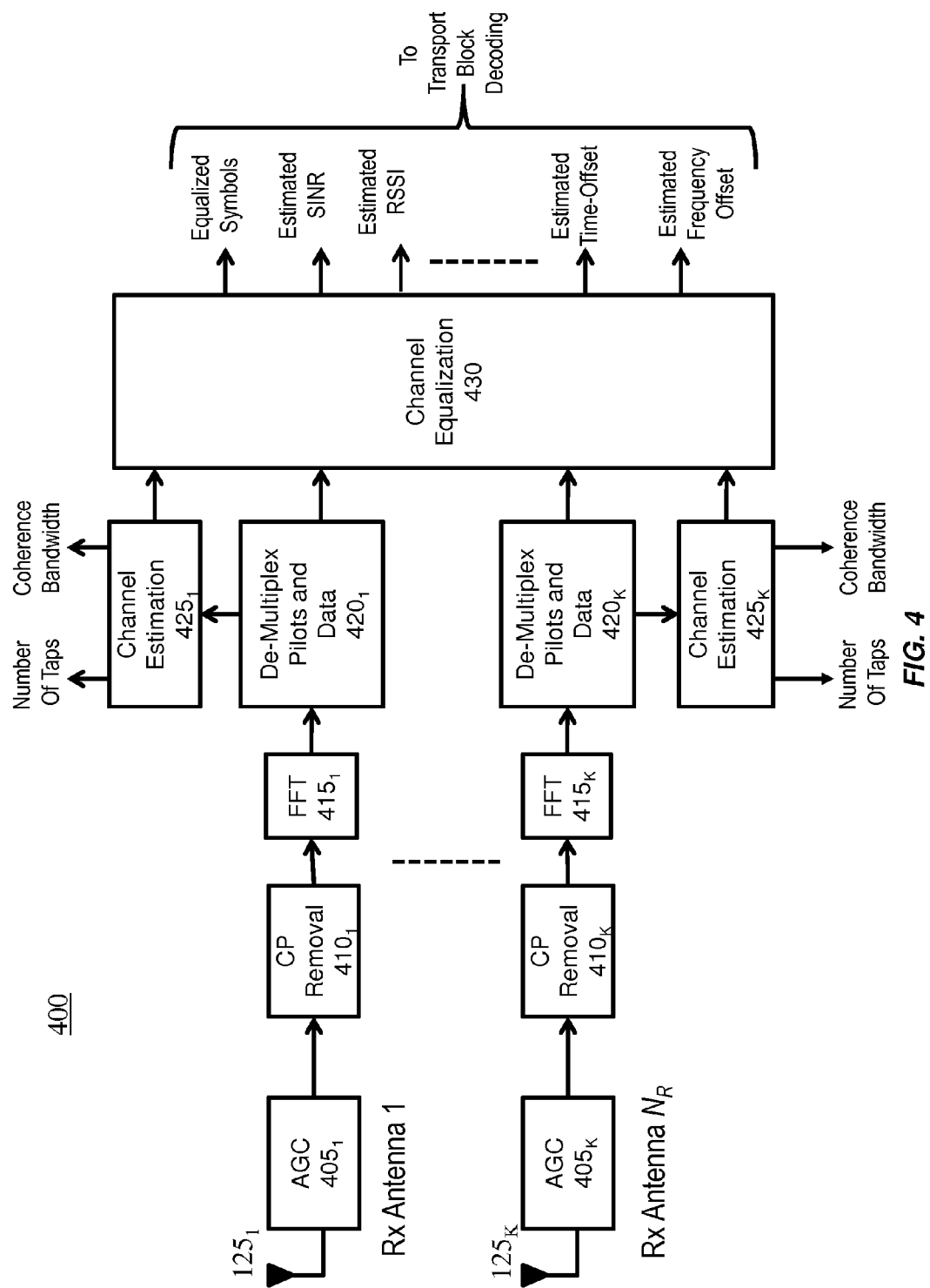
FIG. 4 is a functional system diagram of components of an example receiver with SOI-MA-CE.

FIG. 4 is a functional system diagram 400 of components of an example receiver with SOI-MA-CE 130 (e.g., in a system configured as shown in FIG. 1) for initial physical layer processing including channel estimation and channel equalization. A transmitted signal, having traveled through the wireless channel 140 is received by one or more receive antennas ($125_1$, ..., $125_K$).

With a single receiver antenna $125_1$, the time-varying and frequency-selective channel between the transmitter and the receiver can be described as $$h(t, \tau) = \sum_{l=1}^{L(t)} h_l(t)\delta(\tau - \tau_l(t))$$

where the variable t corresponds to time variations, the variable τ corresponds to the delay-domain, and the actual delay is denoted by $\tau_l(t)$. The delays are varying with time, therefore $\tau_l$ is a function of t. The number of paths, L(t), and the channel gains, $h_l(t)$, are also time-varying. Channel coherence in time-domain can be defined as the time duration during which the delays $\tau_l(t)$, the number of paths L(t), and the channel gains $h_l(t)$ do not change with time. If $T_C$ denotes the channel coherence, then for all $t \in T_C$, $$h(\tau) = \sum_{l=1}^{L} h_l \delta(\tau - \tau_l)$$

Assuming sampling of the continuous received signal is at a rate of $1/T_S$, then the sample-spaced impulse response can be given by $$h(\tau) = \sum_{n=0}^{N} h(n) \delta(\tau - nT_S)$$

where N is the number of samples, and h(n) now is the n-th sample of the impulse response with a delay of $nT_S$. However, since the channel length cannot be more than the length of cyclic prefix, $N_{CP}$, there is effectively up to $N_{CP}$ non-zero samples of the channel h(n).

At the example receiver with SOI-MA-CE 130, for each receiver antenna 125$_i$ (where i=1, 2, ..., K), after performing down-conversion processing, automatic gain control (AGC) can be performed at 405$_i$, CP removal can be performed at 410$_i$ leaving OFDM or SC-FDMA symbols, which can be processed using an FFT at 415$_i$ into the frequency domain. The effect of CP removal 410$_i$ and FFT 415$_i$ is that the linear convolution, in time-domain, of the transmitted signal with the channel response becomes frequency-domain multiplication of the transmitted signal with the channel response.

The pilot symbols, having been previously multiplexed with modulation symbols in the Resource Mapper 330, as shown in FIG. 3, can be de-multiplexed from the frequency domain data at 420$_i$. The pilot pulses and de-multiplexed data can be provided for channel estimation at 425$_i$, which will estimate the channel response 140. Once the channel estimation at 425$_i$ is complete, channel equalization for each receive data stream can be performed at 430.

Regarding channel estimation at 425$_i$, the frequency-domain version of the sample-spaced impulse response can denoted by H(f), and can be given by $$H(f) = \sum_{n=0}^{N_{CP}} h(n) e^{-j2\pi n f T_S}$$

With pilot symbols inserted at frequency tones $f_1$, $f_2$ ..., $f_P$, where P is the number of pilot tones, the received frequency-domain signal can be given by $$R(f_p) = S_p H(f_p) + W_p, p=1,2,\ldots,P$$

where $S_p$ the p-th pilot symbol, and $W_p$ is frequency-domain noise added on the p-th pilot symbol.

The frequency-domain least-squares channel estimate (FDLSCE) on the p-th pilot symbol can given by $$Y(f_p) = \frac{R(f_p)}{S_p} = H(f_p) + V_p, \quad p = 1, 2, \ldots, P$$

where $$V_p = \frac{W_p}{S_p}.$$

For convenience, the FDLSCE can be written compactly in the matrix-vector form as $$Y = \begin{bmatrix} Y(f_1) \\ Y(f_2) \\ \vdots \\ Y(f_P) \end{bmatrix} = \begin{bmatrix} 1 & e^{-j2\pi f_1 T_S} & \ldots & e^{-j2\pi f_1 N_{CP} T_S} \\ 1 & e^{-j2\pi f_2 T_S} & \ldots & e^{-j2\pi f_2 N_{CP} T_S} \\ \vdots & \vdots & \ddots & \vdots \\ 1 & e^{-j2\pi f_P T_S} & \ldots & e^{-j2\pi f_P N_{CP} T_S} \end{bmatrix} \begin{bmatrix} h(0) \\ h(1) \\ \vdots \\ h(N_{CP}) \end{bmatrix} + \begin{bmatrix} V_1 \\ V_2 \\ \vdots \\ V_P \end{bmatrix}$$

$$= Fh + V$$

where F is the matrix of complex exponentials, h is the vector of unknown channel impulse response, and V is a noise vector. Given the number of pilot tones P, the pilot tone locations $f_1, f_2 \ldots, f_P$, the sampling rate $1/T_S$, and the cyclic-prefix length, in some implementations, the matrix F can be pre-computed and stored.

Figure 5:
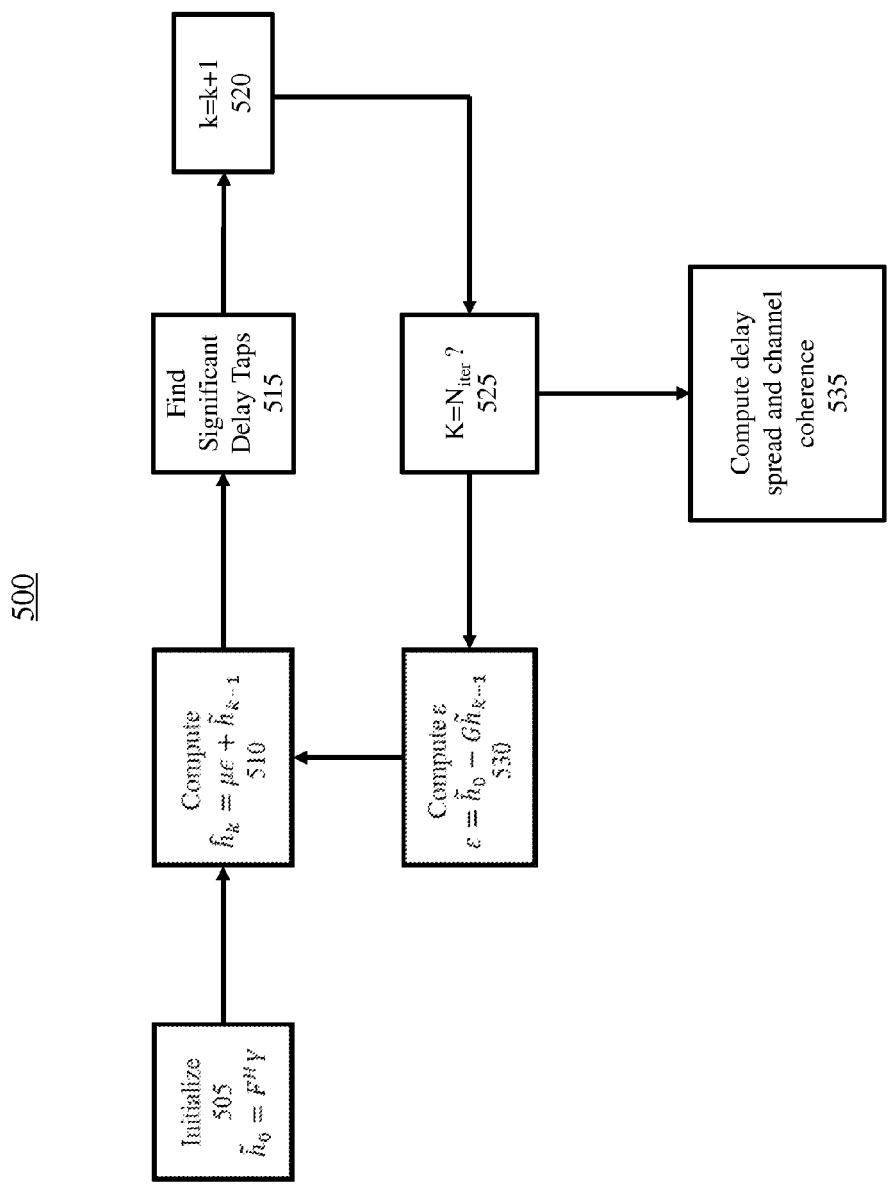
FIG. 5 is a functional block diagram illustrating an iterative SOI-MA-CE process to estimate a channel impulse response.

FIG. 5 is a functional block diagram illustrating an iterative SOI-MA-CE process 500 to estimate the channel response 140 (H(n)). More specifically, in this example implementation, the estimate is of the time domain channel denoted by $\tilde{h}_{N_{iter}}$. Initialization of the processing can occur at 505. An initial channel estimate $\tilde{h}_0$ can provided at 505 and can be computed as $$\tilde{h}_0 = F^{Herm} Y$$

where Herm is the Hermitian operator (i.e., conjugate the entries of the matrix first, and then the matrix transpose). Additionally, an initial error ε can be provided at 505 and can be computed as $$\epsilon = \tilde{h}_0 - G\tilde{H}_0$$

where G can be computed as $G = F^{Herm} F$.

At 510, an intermediate channel estimate $\hat{h}_k$ can be computed by adding the prior computed channel estimate $\tilde{H}_{k-1}$ to the error ε. The error ε can be scaled by a factor μ. In some implementations, $\hat{h}_k$ can be computed according to $$\hat{h}_k = \mu \epsilon + \tilde{h}_{k-1} = \mu(\tilde{h}_0 - G\tilde{h}_{k-1}) + \tilde{h}_{k-1}$$

Where μ is non-negative and can be obtained from link-level or system-level simulations. Additionally, K can be initialized to 1.

At 515, significant delay taps can be determined from $\hat{h}_k$. Delay taps can be significant when they are non-zero, or when they are above a predetermined threshold. For example, finding significant delay taps can be performed by finding the nonzero entries of $(|\hat{h}_k(0)|, \ldots, |\hat{h}_k(N_{CP})|)$. The significant delay taps can form the non-zero entries in a sparse vector describing the channel estimate $\tilde{h}_k$.

At 520, variable K can be incremented (e.g., k=k+1) and at 525 it can be determined whether $N_{iter}$ iterations have completed. $N_{iter}$ can be a predetermined or predefined number of iterations for processing the sparse ordered channel estimate $\tilde{h}_k$.

If the processing is to continue (e.g., there have not been $N_{iter}$ iterations completed), then at 530, the error $\epsilon$ between the initial estimate $\tilde{h}_0$ and the most recent estimate $\tilde{h}_{k-1}$ can be computed according to $$\epsilon = \tilde{h}_0 - G\tilde{h}_{k-1}$$

The process can iterate (e.g., through 510, 515, 520, 525, and 530) until a predetermined number of iterations has completed (e.g., $N_{iter}$), or until another stopping criterion is reached. Other stopping criterion can include, for example, when $\tilde{h}_k$ includes a predetermined number of non-zero delay taps.

Once the iteration is complete, a final channel response estimate (denoted by $\tilde{h}_{N_{iter}}$) can, at 535, be used to compute channel delay spread and channel coherence bandwidth. The maximum and minimum delay spreads can be determined by max $(I_1, I_2, \ldots, I_Q)$ and min $(I_1, I_2, \ldots, I_Q)$, respectively, where the locations of non-zero entries in $\tilde{h}_{N_{iter}}$ are denoted by $(I_1, I_2, \ldots, I_Q)$, and where Q is the number of non-zero taps. The average delay spread can be given by $$D_{Avg} = \frac{\sum_{c=1}^{N_c}\sum_{k=1}^{Q}|\tilde{h}_{N_{iter}}^{(c)}(I_k)|^2 I_k}{\sum_{c=1}^{N_c}\sum_{k=1}^{Q}|\tilde{h}_{N_{iter}}^{(c)}(I_k)|^2}$$

where c is the channel estimate index within the coherence window of $N_C$ symbols.

The Root Mean Squared (RMS) delay-spread can be given by $$D_{RMS} = \sqrt{\frac{\sum_{c=1}^{N_c}\sum_{k=1}^{Q}|\tilde{h}_{N_{iter}}^{(c)}(I_k)|^2 I_k^2}{\sum_{c=1}^{N_c}\sum_{k=1}^{Q}|\tilde{h}_{N_{iter}}^{(c)}(I_k)|^2} - (D_{Avg})^2}$$

The frequency-domain channel estimate on a given frequency tone can be obtained as $$\tilde{H}(f) = \sum_{k=1}^{Q}\tilde{h}_{N_{iter}}(I_k)e^{-j2\pi d_k f T_s}$$

The channel coherence is inversely proportional to the channel delay spread. A typical coherence bandwidth measure, based on the RMS delay spread, with 90% correlation in frequency domain can be given by $$W_{coherence} = \frac{1}{50 D_{RMS}}$$

With 50% correlation in frequency domain, the coherence bandwidth is given by $$W_{coherence} = \frac{1}{5 D_{RMS}}$$

The following is an algorithm for an example implementation of a receiver with SOI-MA-CE 130.

1. Obtain the initial channel estimate as $\tilde{h}_0 = F^{Herm}Y$
2. Perform the following computations for each of the $N_{iter}$ iterations $$\left.\begin{aligned}\tilde{h}_k &= \mu(\tilde{h}_0 - G\tilde{h}_{k-1}) + \tilde{h}_{k-1}\\ [MaxVal, Idx] &= \max(|\hat{h}_k(0)|, \ldots, |\hat{h}_k(N_{CP})|)\\ \tilde{h}_k &= \text{zeros}(N_{CP}+1, 1)\\ \tilde{h}_k(Idx) &= MaxVal\end{aligned}\right\} k=1, 2, \ldots, N_{iter}$$

3. The final estimate of the time-domain channel is given by $\tilde{h}_{N_{iter}}$. The number of non-zero positions in the above vector is the length of the channel response in time, and the locations of non-zero values are the sample-spaced tap delays.
4. Compute the maximum, minimum, average and RMS delay spread and channel coherence bandwidth.

The following extends the above-described SOI-MA-CE scheme to multiple receiver antennas.

With M receiver antennas, the sample-spaced time-domain channel from the transmitter antennas to the $m^{th}$ receiver antenna is given by $$h(\tau, m) = \sum_{n=0}^{N_{CP}} h(n, m)\delta(\tau - nT_S)$$

And the FDLSCE on $m^{th}$ receiver antenna can be described as $$Y(m) = \begin{bmatrix}Y(f_1, m)\\Y(f_2, m)\\\vdots\\Y(f_p, m)\end{bmatrix} = \begin{bmatrix}1 & e^{-j2\pi f_1 T_S} & \ldots & e^{-j2\pi f_1 N_{CP} T_S}\\1 & e^{-j2\pi f_2 T_S} & \ldots & e^{-j2\pi f_2 N_{CP} T_S}\\\vdots & \vdots & \ddots & \vdots\\1 & e^{-j2\pi f_p T_S} & \ldots & e^{-j2\pi f_p N_{CP} T_S}\end{bmatrix}\begin{bmatrix}h(0, m)\\h(1, m)\\\vdots\\h(N_{CP}, m)\end{bmatrix} +$$

$$\begin{bmatrix}V_1(m)\\V_2(m)\\\vdots\\V_P(m)\end{bmatrix} = Fh(m) + V(m)$$

Upon stacking $Y(1), Y(2), \ldots, Y(M)$ in columns for all the receiver antennas, Y can be described as $$\begin{aligned}Y &= [Y(1) \quad Y(2) \quad \ldots \quad Y(M)]\\ &= F[h(1) \quad h(2) \quad \ldots \quad h(M)] + [V(1) \quad V(2) \quad \ldots \quad V(M)]\\ &= FH + V\end{aligned}$$

The following is an algorithm for an example implementation of a receiver with SOI-MA-CE 130 having multiple receiver antennas.

1. Obtain the initial channel estimate as $\tilde{H}_0 = F^{Herm}Y$
2. Perform the following computations for each of the $N_{iter}$ iterations $$\left.\begin{array}{l}\hat{H}_k = \mu(\tilde{H}_0 - G\tilde{H}_{k-1}) + \tilde{H}_{k-1}\\ [MaxVal, Idx] = \max\left(\sum_{m=1}^{M}|\hat{H}_k(0,m)|^2, \ldots, \sum_{m=1}^{M}|\hat{H}_k(N_{CP},m)|^2\right)\\ \tilde{H}_k = \text{zeros}(N_{CP}+1, M)\\ \tilde{H}_k(Idx, m) = \hat{H}_k(Idx, m) \ m=1,2,\ldots,M \end{array}\right\}$$

$$k = 1, 2, \ldots, N_{iter}$$

3. The final estimate of the time-domain channel is given by $\tilde{H}_{N_{iter}}$. The number of non-zero positions in the above vector is the length of the channel response in time, and the locations of non-zero values are the sample-spaced tap delays.

4. Compute the maximum, minimum, average and RMS delay spread and channel coherence bandwidth.

Delay spread and channel coherence bandwidth for multiple receive antennas can be computed as follows. The maximum and minimum delay spreads for receive antenna m can be determined by $D_{max,m} = \max(I_{1,m}, I_{2,m}, \ldots, I_{Q_m,m})$ and $D_{min,m} = \min(I_{1,m}, I_{2,m}, \ldots, I_{Q_m,m})$, respectively, where the location of non-zero entries in $\tilde{H}_{N_{iter}}(:,m)$ are denoted by $(I_{1,m}, I_{2,m}, \ldots, I_{Q_m,m})$, and where $Q_m$ is the number of non-zero taps and is a function of receiver antenna index. The average delay spread can be given by $$D_{Avg,m} = \frac{\sum_{c=1}^{N_C}\sum_{k=1}^{Q_m}|\tilde{H}_{N_{iter}}^{(c)}(I_{k,m},m)|^2 I_{k,m}}{\sum_{c=1}^{N_C}\sum_{k=1}^{Q_m}|\tilde{H}_{N_{iter}}^{(c)}(I_{k,m},m)|^2}$$

where c is the channel estimate index within the coherence window of $N_C$ symbols.

The Root Mean Squared (RMS) delay-spread can be given by $$D_{RMS,m} = \sqrt{\frac{\sum_{c=1}^{N_C}\sum_{k=1}^{Q_m}|\tilde{H}_{N_{iter}}^{(c)}(I_{k,m},m)|^2 I_{k,m}^2}{\sum_{c=1}^{N_C}\sum_{k=1}^{Q_m}|\tilde{H}_{N_{iter}}^{(c)}(I_{k,m},m)|^2} - (D_{Avg,m})^2}$$

Aggregate delay statistics across all the receiver antennas can be determined by using total channel power across the receiver antennas. The frequency-domain channel estimate on a given frequency tone, and on a given receiver antenna, can be obtained as $$\tilde{H}(f,m) = \sum_{k=1}^{Q_m}\tilde{H}_{N_{iter}}(I_{k,m},m)e^{-j2\pi d_{k,m}fT_s}$$

The channel coherence is inversely proportional to the channel delay spread. A typical coherence bandwidth measure, based on the RMS delay spread, with 90% correlation in frequency domain can be given by $$W_{coherence} = \begin{cases} \dfrac{1}{50D_{RMS,m}} & \text{specific to antenna } m \\ \dfrac{1}{50D_{RMS}} & \text{Across antennas} \end{cases}$$

The subject matter described herein provides many advantages. For example, the current subject matter does not require channel statistics, and in fact estimates the channel statistics (such as the delay spread, the number of taps) along with estimation of both time-domain and frequency-domain channels. Traditional channel estimation schemes often employ both time- and frequency-domain filtering to smooth the channel variations across time and frequency. However, designing optimal time- and frequency-domain filters require the knowledge of the channel second order statistics.

Additionally, the current subject matter may not require either interpolation or extrapolation, thereby improving the quality of the estimate channel. Implementation of traditional channel estimation algorithms can involve, along with frequency-domain least squares channel estimation, interpolation and extrapolation. Both interpolation and extrapolation approaches introduce additional noise, which reduce the channel estimation reconstruction quality.

Furthermore, the current subject matter can require very few frequency-domain signal samples relative to traditional channel estimation techniques. Once the time-domain channel taps are estimated, the current subject matter can allow for the flexibility of estimating the channel response over a selected sub-set of available frequency tones, which can apply to resource allocation in frequency-domain in multi-user OFDMA/SC-FDMA systems. With multiple users trying to access the same set of frequency resources, the current subject matter can first estimate the frequency-domain channel over the tones in a given allocation for all the users that compete for that allocation. The user that has the best channel quality (e.g., by estimating the channel power) can be given access to that allocation.

As yet another non-limiting example advantage, the current subject matter can provide an estimate of the channel coherence bandwidth. Since channel coherence bandwidth is a measure of channel selectivity in frequency domain, knowledge of the channel coherence bandwidth can enable a scheduler (or resource allocation unit) to make allocations that are diversity in frequency-domain. Frequency-diversity resource allocations provide multi-user frequency-selective scheduling gains.

Figure 6:
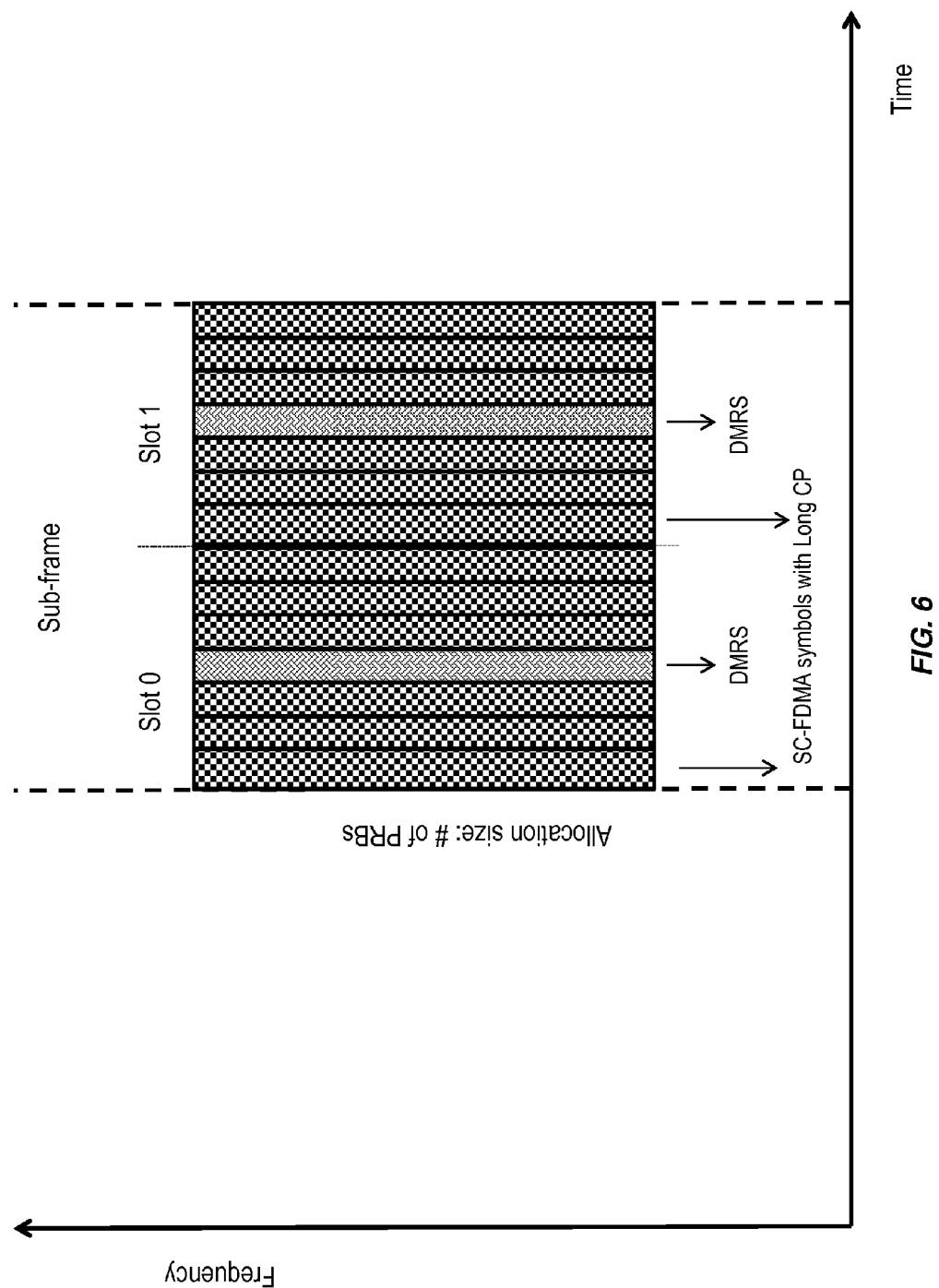
FIG. 6 describes the symbol and slot structure for the Physical Uplink Shared Channel of the 3GPP LTE system with normal cyclic-prefix (CP) mode.
Figure 7:
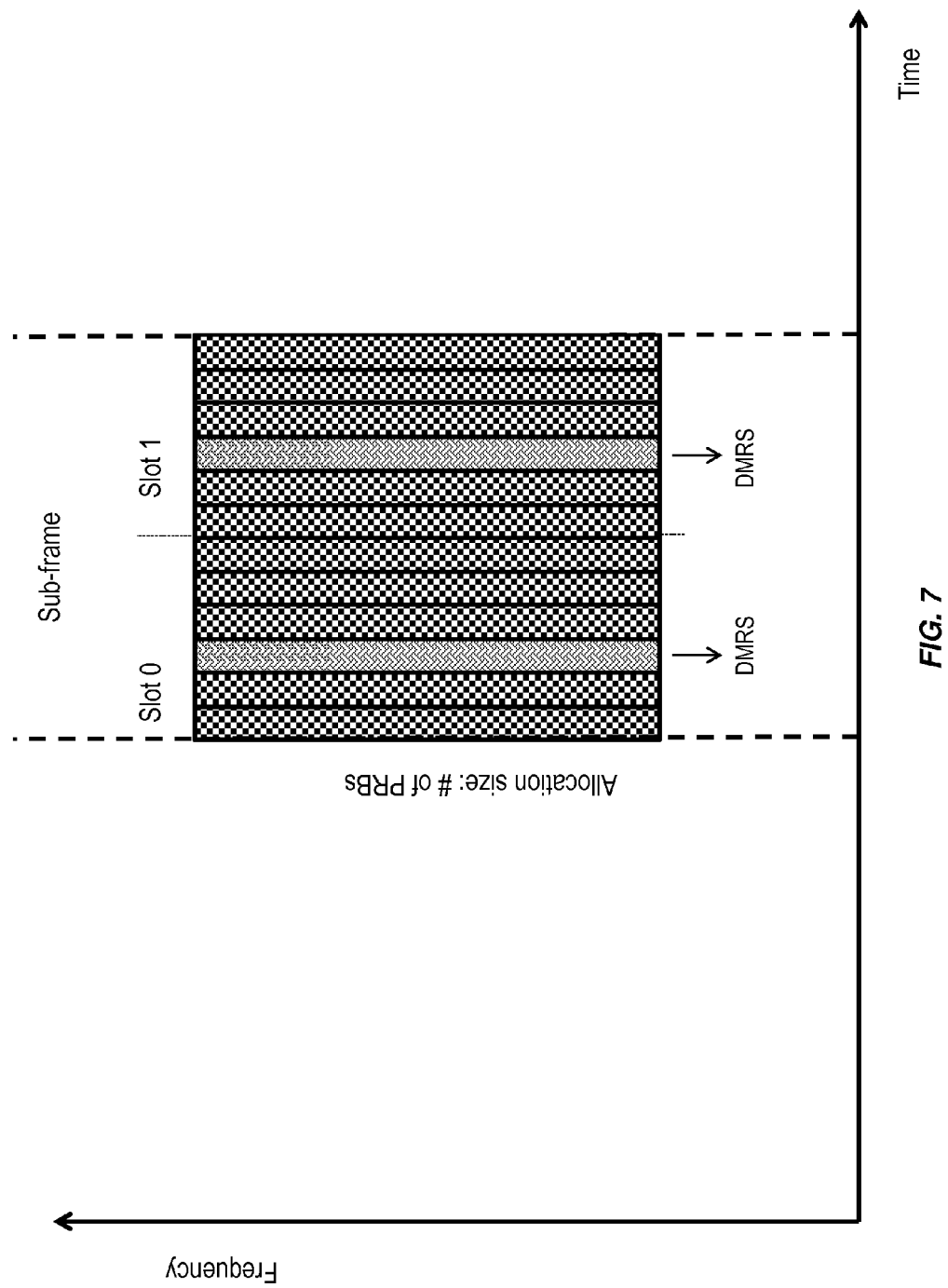
FIG. 7 describes the symbol and slot structure for the Physical Uplink Shared Channel of the 3GPP LTE system with extended cyclic-prefix mode.
Figure 8:
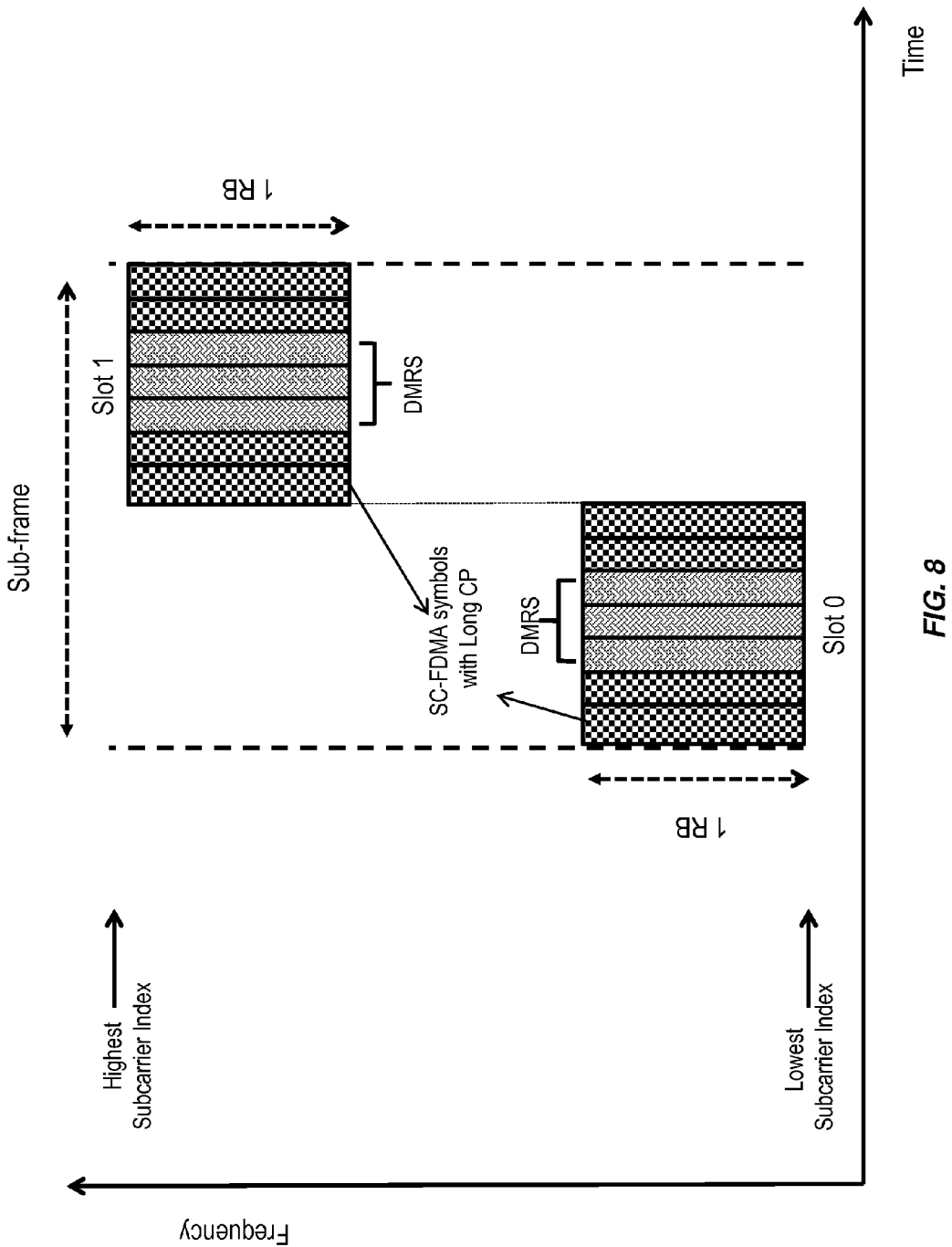
FIG. 8 describes the symbol and slot structure for the Physical Uplink Control Channel, Formats 1, 1a and 1b, of the 3GPP LTE system with normal cyclic-prefix mode.
Figure 9:
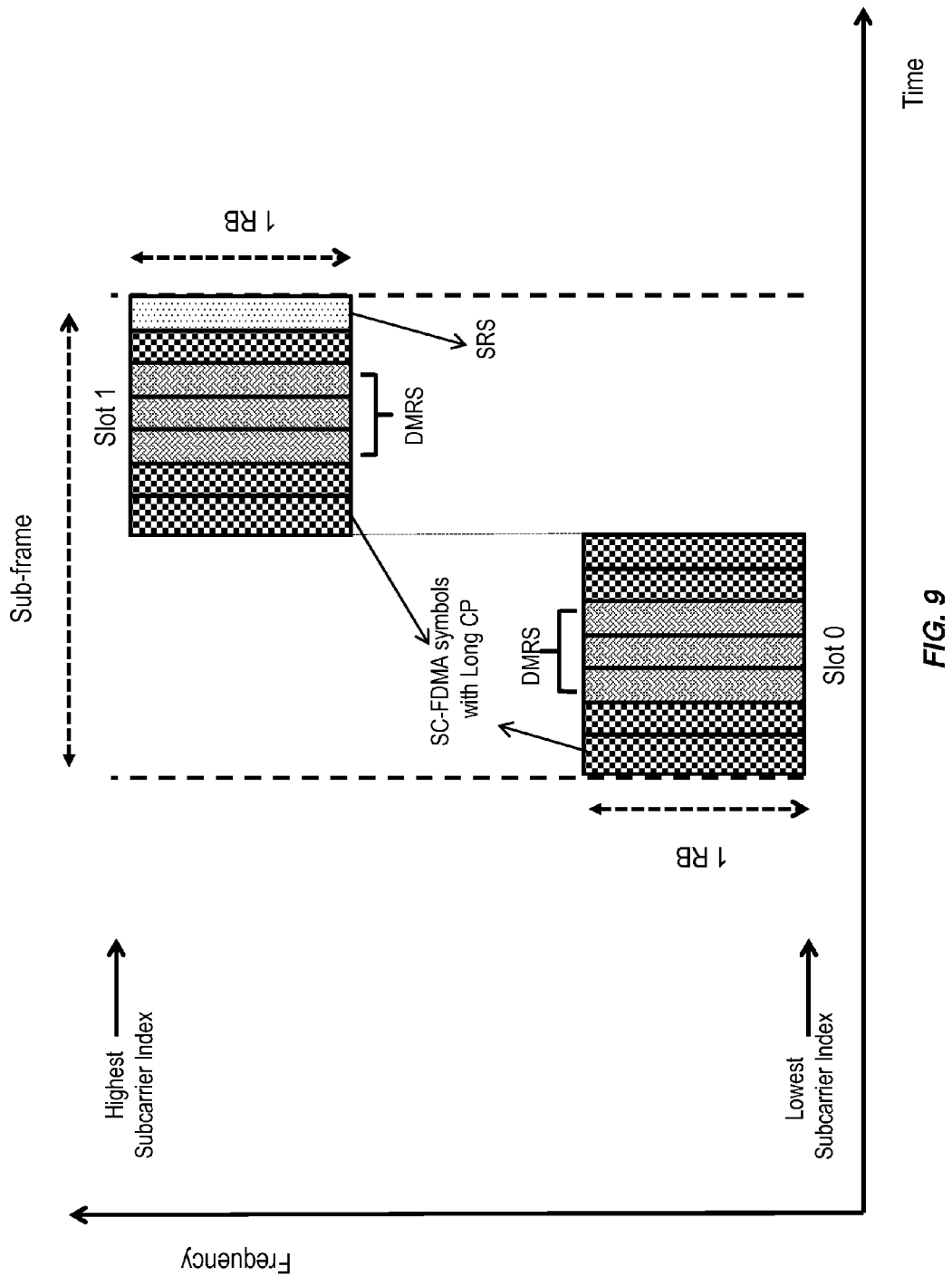
FIG. 9 describes the symbol and slot structure for the Physical Uplink Control Channel, Formats 1a and 1b, of the 3GPP LTE system with normal cyclic-prefix mode, and sounding reference symbol.
Figure 10:
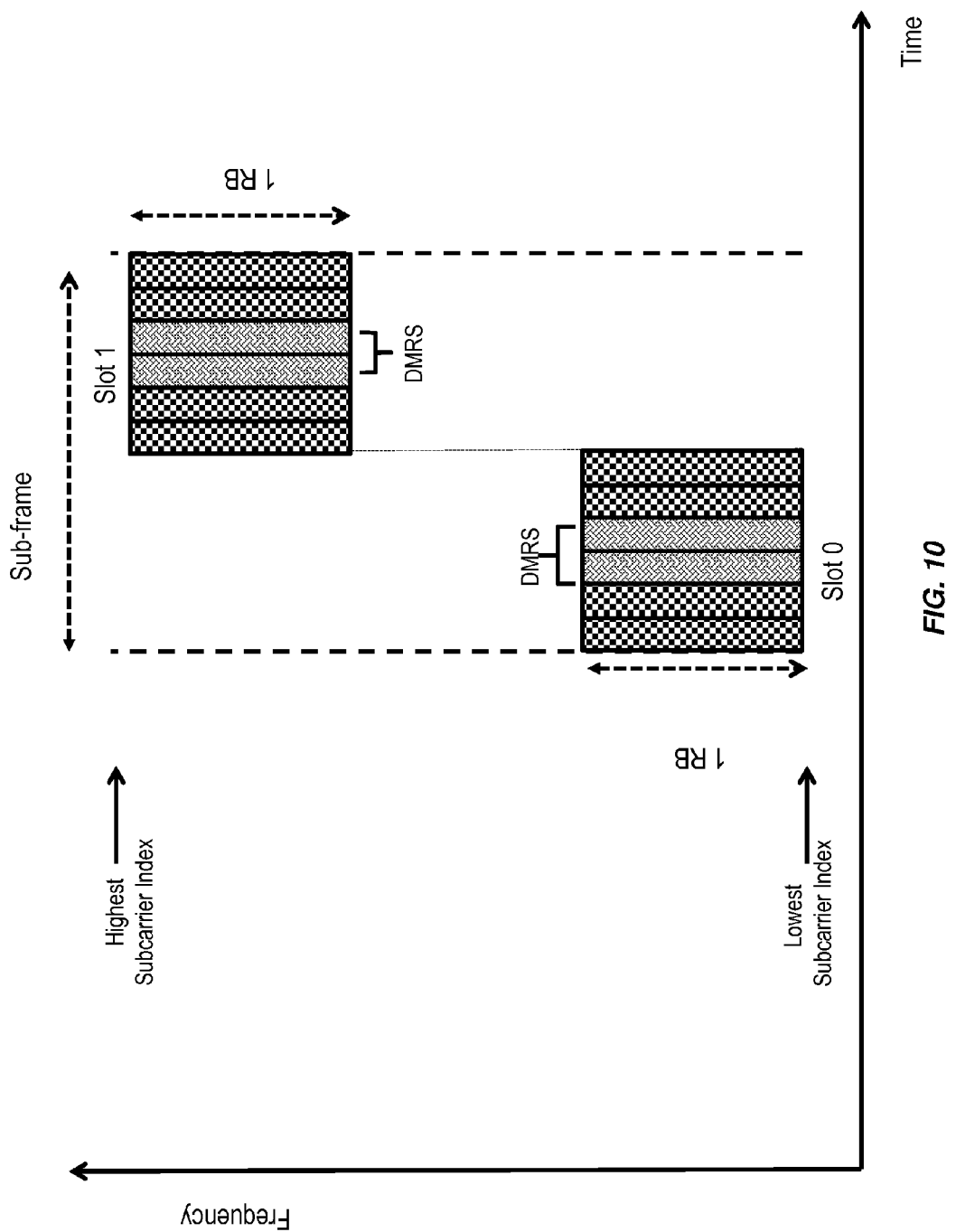
FIG. 10 describes the symbol and slot structure for the Physical Uplink Control Channel, formats 1, 1a and 1b, of the 3GPP LTE system with extended cyclic-prefix mode.
Figure 11:
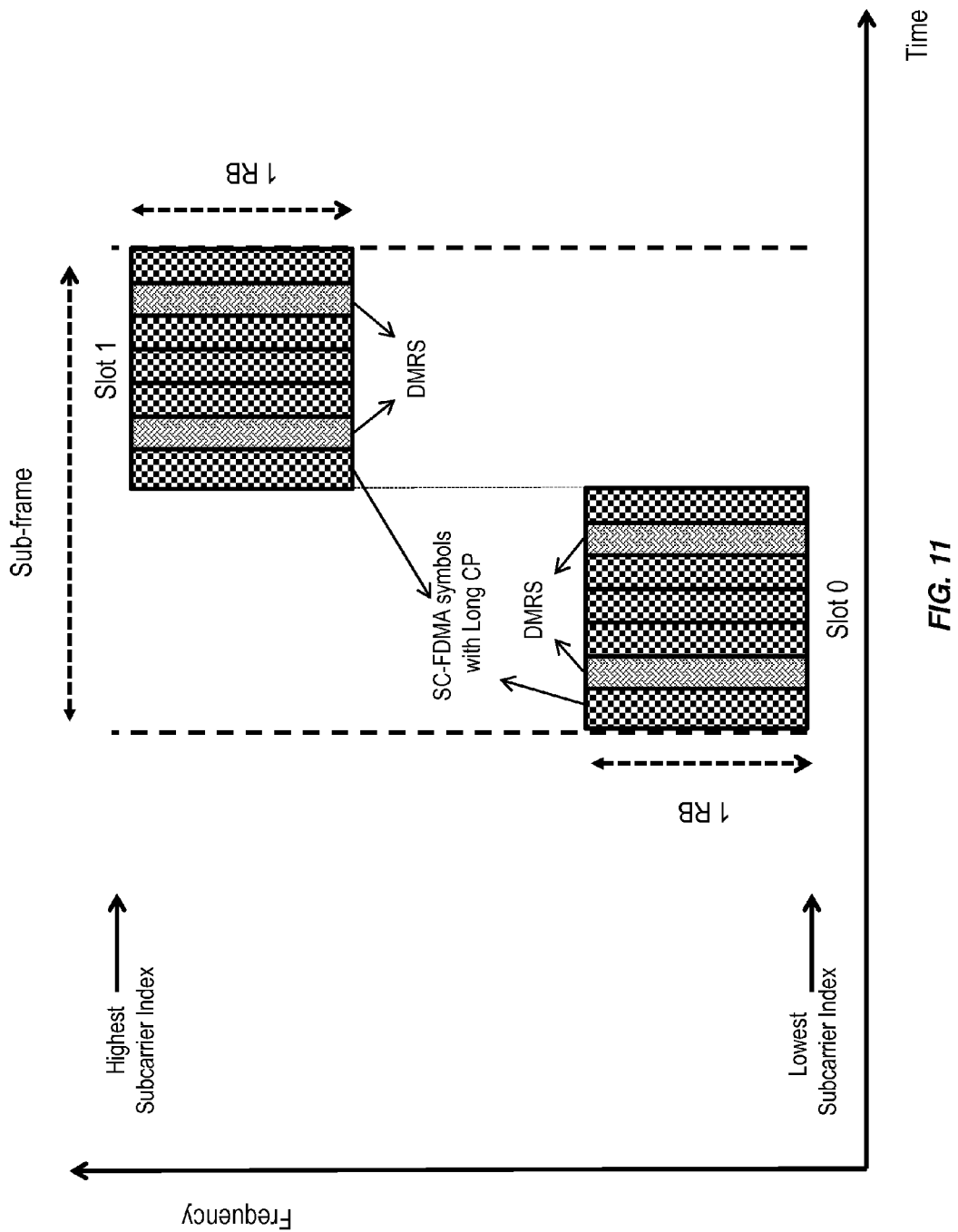
FIG. 11 describes the symbol and slot structure for the Physical Uplink Control Channel, Formats 2, 2a and 2b, of the 3GPP LTE system with normal cyclic-prefix mode.
Figure 12:
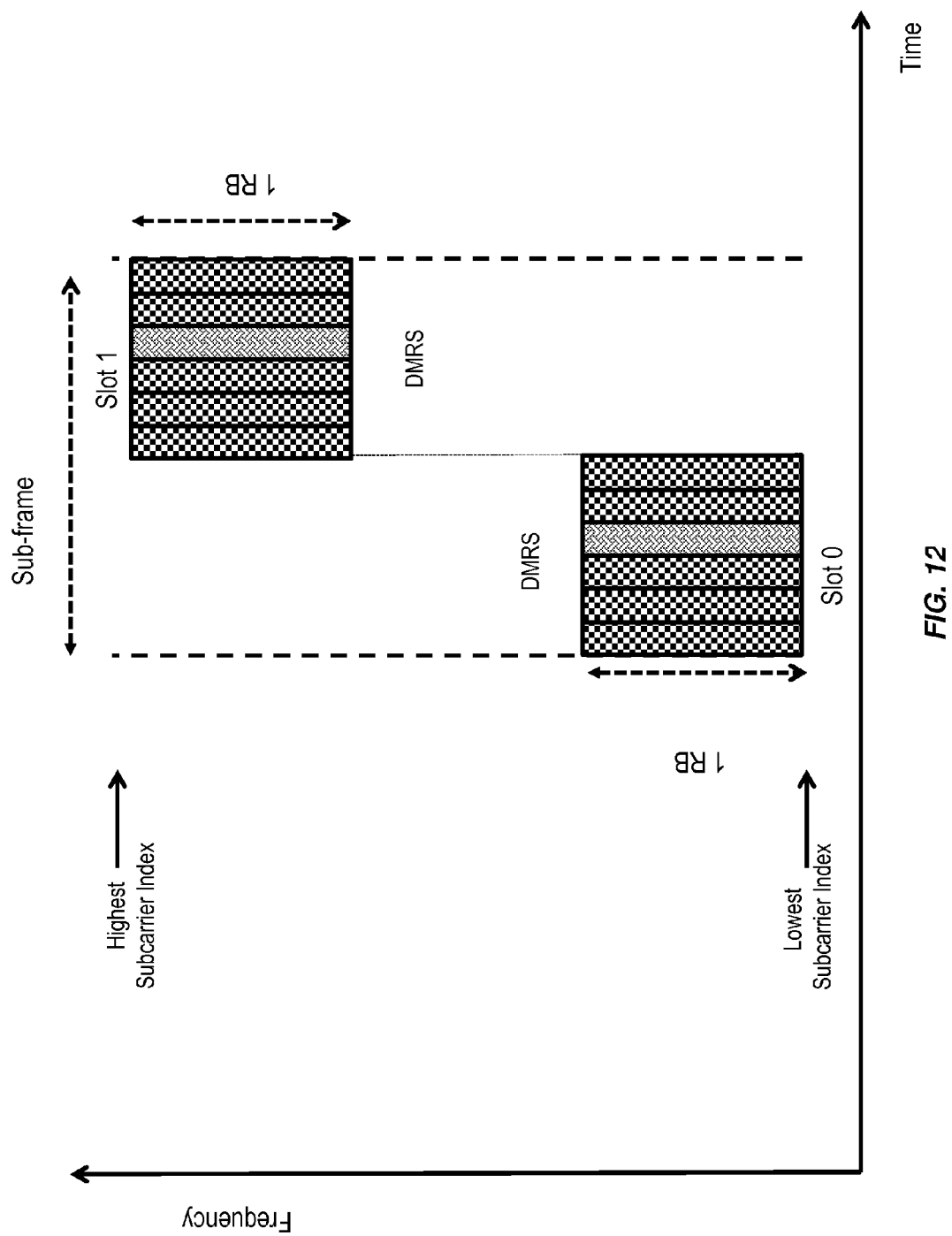
FIG. 12 describes the symbol and slot structure for the Physical Uplink Control Channel, Format 2, of the 3GPP LTE system with extended cyclic-prefix mode.
Figure 13:
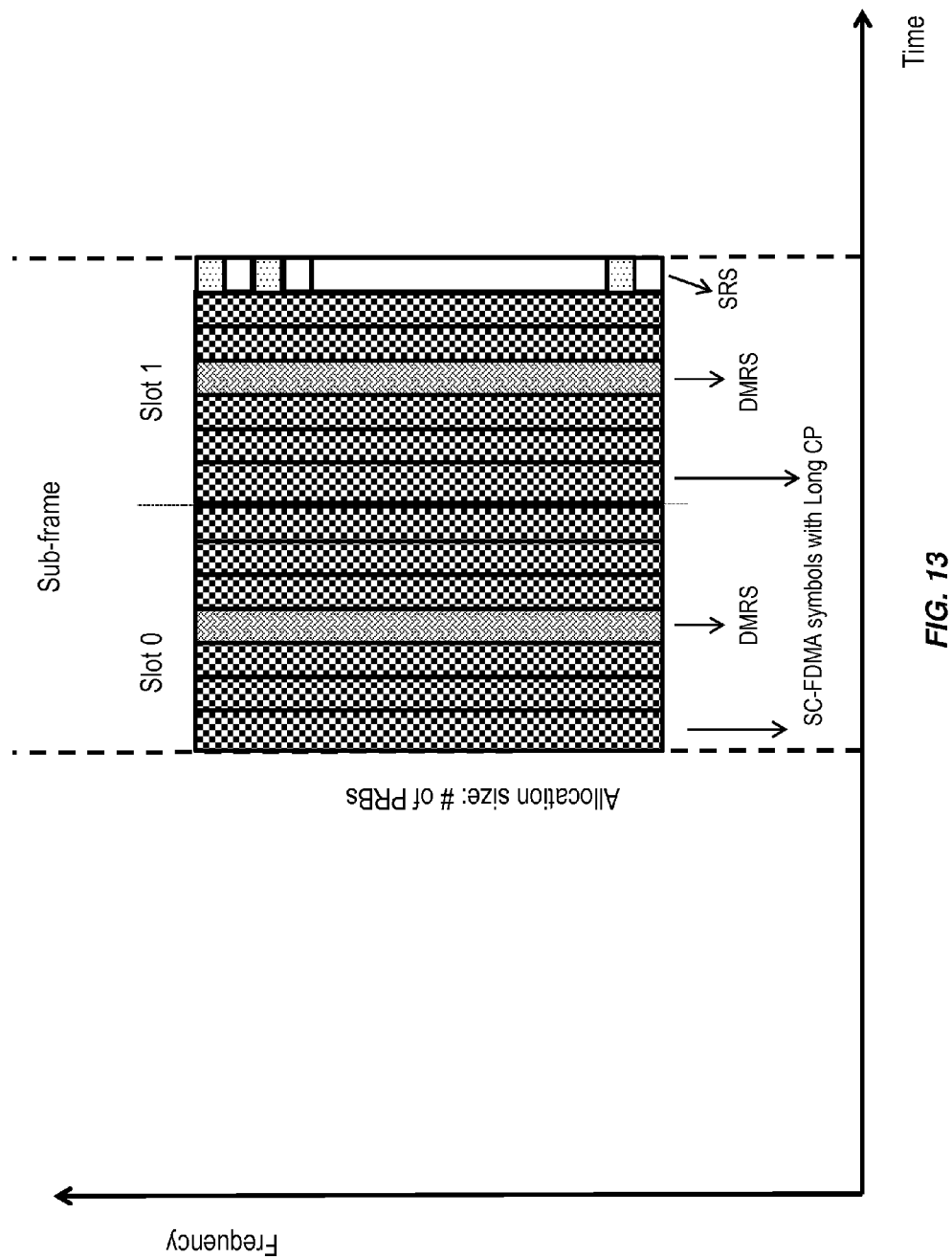
FIG. 13 describes the symbol and slot structure for the Physical Uplink Shared Channel of the 3GPP LTE system with normal cyclic-prefix mode, and sounding reference symbol.
Figure 14:
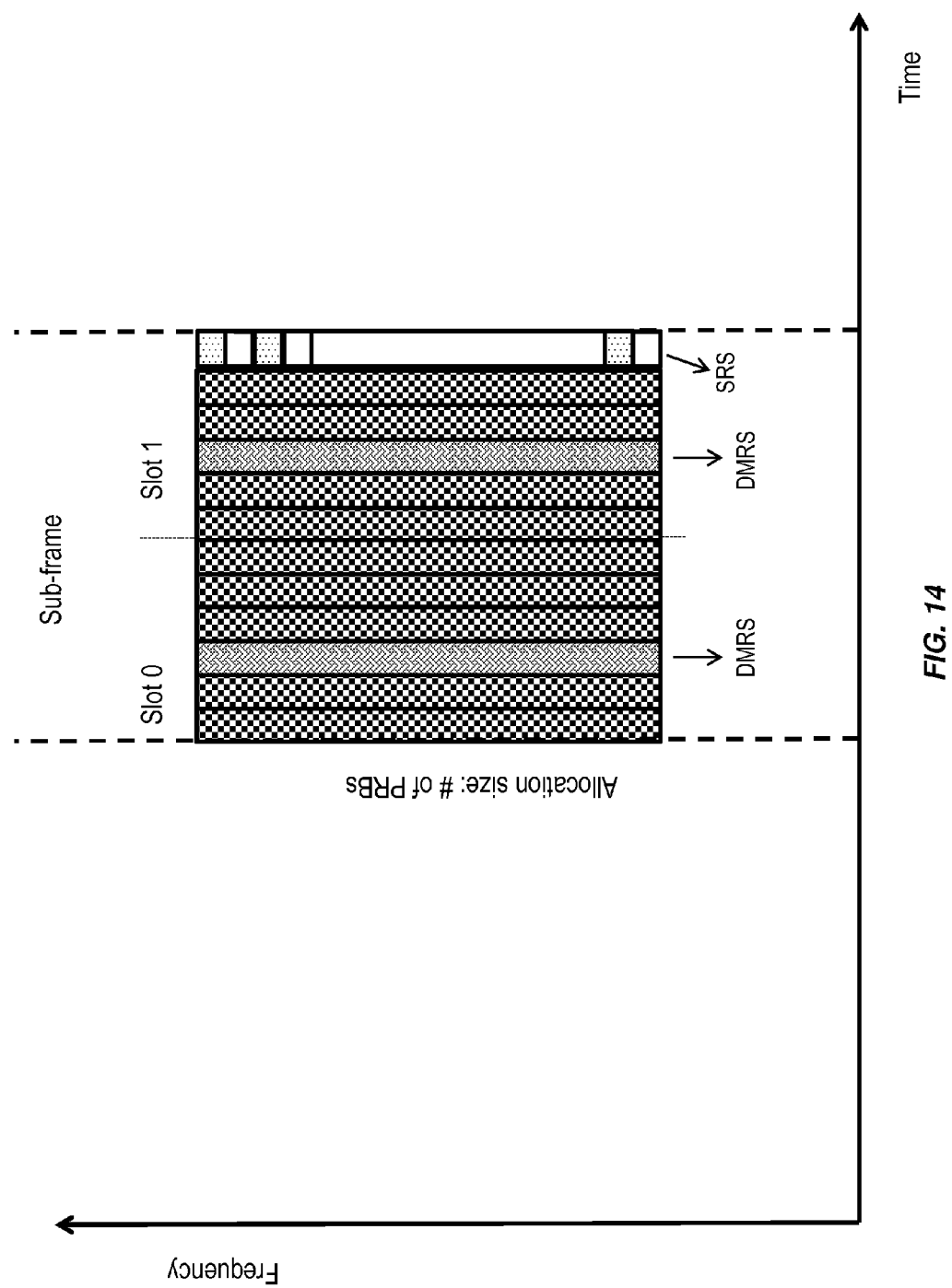
FIG. 14 describes the symbol and slot structure for the Physical Uplink Shared Channel of the 3GPP LTE system with extended cyclic-prefix mode, and sounding reference symbol.
Figure 15:
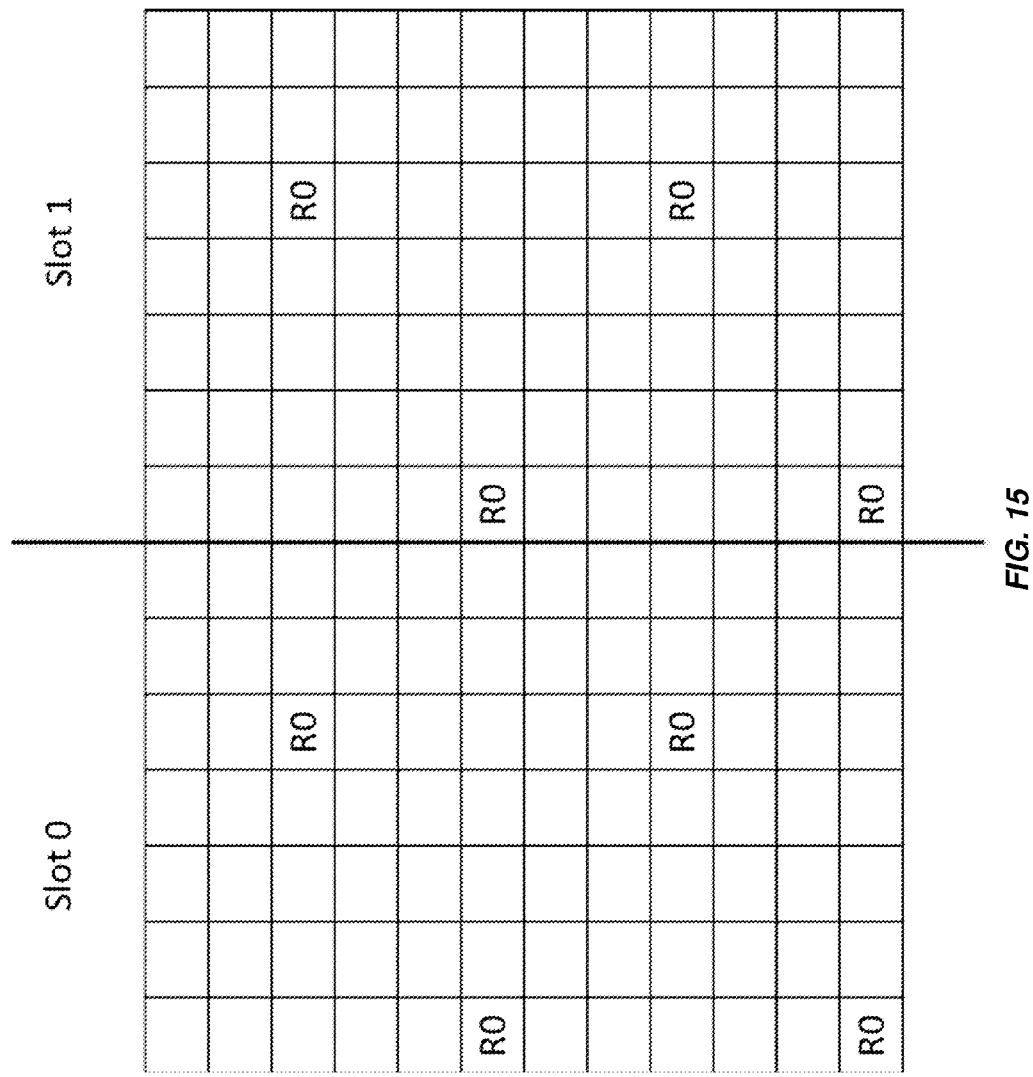
FIG. 15 describes the reference symbol locations for normal cyclic-prefix with one antenna port for the downlink of 3GPP LTE system.

By way of illustration and as an example of pilot pulse configurations, the LTE data channel (PUSCH) has a single demodulation reference symbol (DMRS) within a slot of seven symbols for normal CP (or six symbols for extended CP), as shown in FIGS. 6 and 7. If the channel bandwidth is 20 MHz, and if the PUSCH allocation size is one resource block (RB), which corresponds to 12 consecutive sub-carriers on the DRMS, then the channel estimation task is to obtain the channel estimate on the 1200 useful data tones (in LTE with 20 MHz channel bandwidth, the maximum number of resource blocks is 100, or the maximum number of data tones is 1200 sub-carriers), which is a difficult task with an allocation size of one RB. As a second example, the symbol and slot structure for various uplink control channel (PUCCH) formats are depicted in FIGS. 8 through 12. Here, the PUCCH allocations are made towards the edges of the RB allocations, and estimation of the overall frequency domain channel using traditional approaches can be prone to extrapolation errors. In a similar manner, in FIG. 15 the downlink reference signal structure is detailed for normal CP with one antenna port. Here, in each slot of seven OFDM symbols, there are only four reference signals available for channel estimation. Estimation of the channel on 12 sub-carriers across seven OFDM symbols using four reference symbols can be a difficult task with conventional channel estimation algorithms as they incur both interpolation and extrapolation errors, along with errors due to channel variation across 12 subcarriers over seven OFDM symbols.

Figure 16:
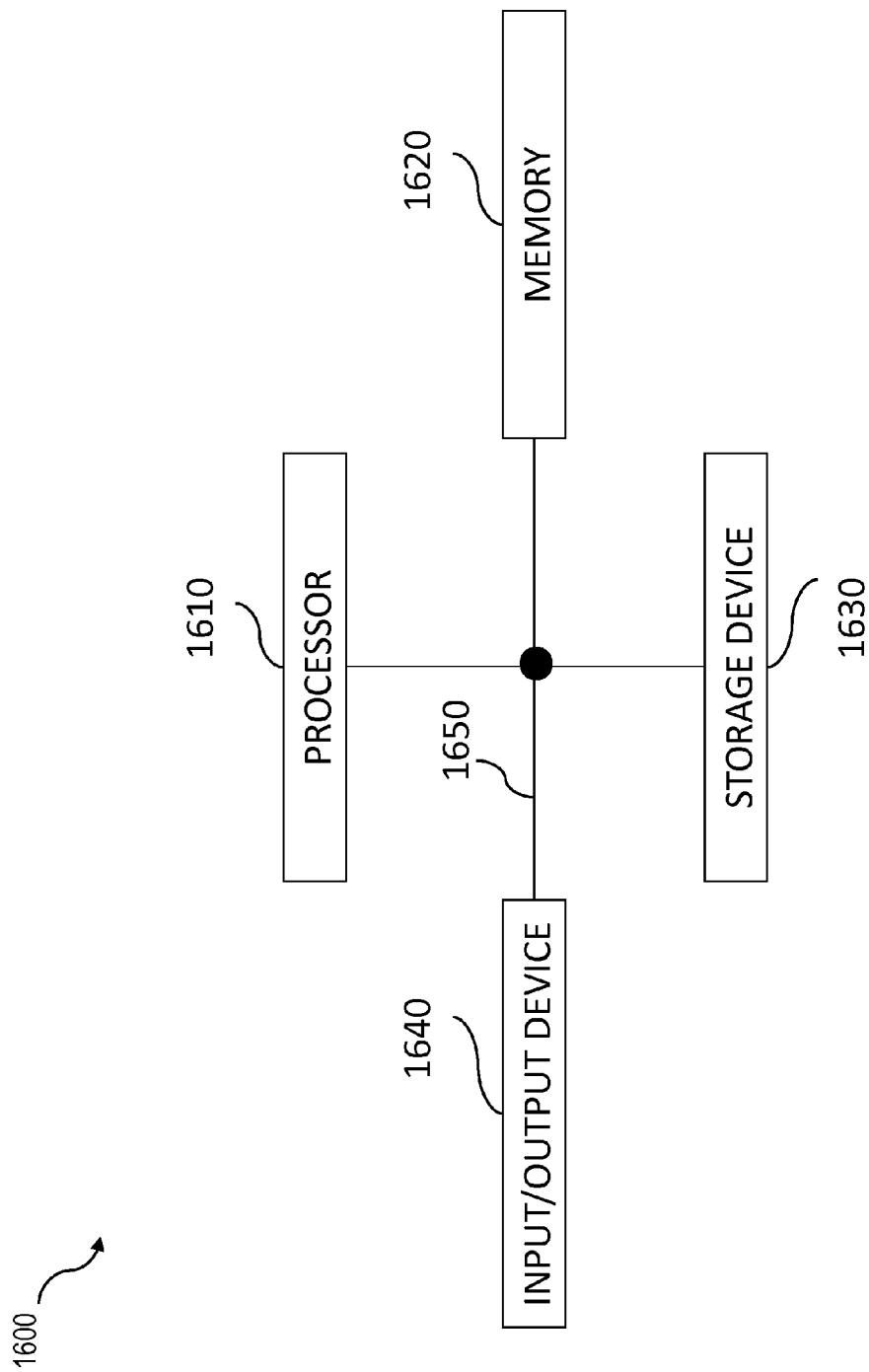
FIG. 16 is a system diagram illustrating an example implementation of a computing system.

In some implementations, the current subject matter can be configured to be implemented in a system 1600, as shown in FIG. 16. The system 1600 can include one or more of a processor 1610, a memory 1620, a storage device 1630, and an input/output device 1640. Each of the components 1610, 1620, 1630 and 1640 can be interconnected using a system bus 1650. The processor 1610 can be configured to process instructions for execution within the system 600. In some implementations, the processor 1610 can be a single-threaded processor. In alternate implementations, the processor 1610 can be a multi-threaded processor. The processor 1610 can be further configured to process instructions stored in the memory 1620 or on the storage device 1630, including receiving or sending information through the input/output device 1640. The memory 1620 can store information within the system 1600. In some implementations, the memory 1620 can be a computer-readable medium. In alternate implementations, the memory 1620 can be a volatile memory unit. In yet some implementations, the memory 1620 can be a non-volatile memory unit. The storage device 1630 can be capable of providing mass storage for the system 1600. In some implementations, the storage device 1630 can be a computer-readable medium. In alternate implementations, the storage device 1630 can be a floppy disk device, a hard disk device, an optical disk device, a tape device, non-volatile solid state memory, or any other type of storage device. The input/output device 1640 can be configured to provide input/output operations for the system 1600. In some implementations, the input/output device 1640 can include a keyboard and/or pointing device. In alternate implementations, the input/output device 1640 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation by one or more data processors forming part of at least one computing system comprising:

receiving, by at least one data processor, data characterizing a first signal transmitted in an orthogonal frequency-division multiplexing (OFDM) system by a transmitter with one or more transmit antennas through a wireless channel and received by a receiver with a plurality of receive antennas, the first signal comprising a plurality of pilot pulses;

determining, using at least one data processor and the first signal, a final estimated time-domain channel impulse response of the wireless channel for each pair of transmitter and receiver antennas by iteratively finding one or more significant delay taps of an intermediate time-domain channel impulse response estimate, calculating an error of the time-domain channel impulse response as a difference between an initial channel estimate and a scaled intermediate time-domain channel estimate, the intermediate time-domain channel impulse response estimate scaled by a product of a conjugate transpose of one or more complex exponentials of a frequency domain least-squares channel estimate and the one or more complex exponentials of the frequency domain least squares channel estimate, scaling the error by a non-negative factor, and feeding the scaled error of the intermediate time-domain channel impulse response estimate back to add to the one or more significant delay taps, the one or more significant delay taps forming entries in the intermediate time-domain channel estimate, wherein finding the one or more significant delay taps includes comparing, during an iteration, a plurality of entries in the intermediate channel impulse response estimate to a threshold; and providing, using at least one data processor, data characterizing the final estimated channel impulse response.

2. The method of claim 1, wherein the one or more significant delay taps are non-zero entries of the intermediate channel impulse response estimate.

3. The method of claim 1, further comprising determining an estimate of a channel frequency response for a plurality of sub-carriers.

4. The method of claim 1, further comprising determining an estimate of a length of a channel impulse response of the wireless channel.

5. The method of claim 1, further comprising determining, for each of the one or more transmit antennas, one or more of a maximum delay spread of the wireless channel, a minimum delay spread of the wireless channel, an average delay spread of the wireless channel, and a root-mean-square delay of the wireless channel.

6. The method of claim 1, further comprising determining for each of the one or more transmit antennas, an estimate of a channel coherence bandwidth.

7. The method of claim 1, wherein iteratively finding significant delay taps of the intermediate channel impulse response estimate and feeding an error of the intermediate channel impulse response estimate back to add to the one or more significant delay taps is performed according to $$\hat{H}_k = \mu(\tilde{H}_0 - G\tilde{H}_{k-1}) + \tilde{H}_{k-1}$$
$$[MaxVal, Idx] = \max\left(\sum_{m=1}^{M} |\hat{H}_k(0,m)|^2, \ldots, \sum_{m=1}^{M} |\hat{H}_k(N_{CP},m)|^2\right)$$
$$\tilde{H}_k = \text{zeros}(N_{CP}+1, M)$$
$$\tilde{H}_k(Idx, m) = \hat{H}_k(Idx, m) \; m = 1, 2, \ldots, M$$

$$k = 1, 2, \ldots, N_{iter}$$

where M is a number of receive antennas; and G, $N_{iter}$, $N_{CP}$, and $\mu$ are predetermined, wherein G is $F^{Herm}F$, F is the one or more complex exponentials of the frequency domain least-squares channel estimate, $N_{iter}$ is a scalar, $N_{CP}$ is a length of cyclic prefix, $\mu$ is the non-negative error scaling factor, and Idx characterizes locations of the significant delay taps.

8. A non-transitory computer program product storing instructions, which when executed by at least one data processor of at least one computing system, implement a method comprising:

receiving, by at least one data processor, data characterizing a first signal transmitted in an orthogonal frequency-division multiplexing (OFDM) system by a transmitter with one or more transmit antennas through a wireless channel and received by a receiver with a plurality of receive antennas, the first signal comprising a plurality of pilot pulses;

determining, using at least one data processor and the first signal, a final estimated time-domain channel impulse response of the wireless channel for each pair of transmitter and receiver antennas by iteratively finding one or more significant delay taps of an intermediate time-domain channel impulse response estimate, calculating an error of the time-domain channel impulse response as a difference between an initial channel estimate and a scaled intermediate time-domain channel estimate, the intermediate time-domain channel impulse response estimate scaled by a product of a conjugate transpose of one or more complex exponentials of a frequency domain least-squares channel estimate and the one or more complex exponentials of the frequency domain least squares channel estimate, scaling the error by a non-negative factor, and feeding the scaled error of the intermediate time-domain channel impulse response estimate back to add to the one or more significant delay taps, the one or more significant delay taps forming entries in the intermediate time-domain channel estimate, wherein finding the one or more significant delay taps includes comparing, during an iteration, a plurality of entries in the intermediate channel impulse response estimate to a threshold; and providing, using at least one data processor, data characterizing the final estimated channel impulse response.

9. The non-transitory computer program product of claim 8, wherein the one or more significant delay taps are non-zero entries of the intermediate channel impulse response estimate.

10. The non-transitory computer program product of claim 8, the method further comprising determining an estimate of a channel frequency response for a plurality of sub-carriers.

11. The non-transitory computer program product of claim 8, the method further comprising determining an estimate of a length of a channel impulse response of the wireless channel.

12. The non-transitory computer program product of claim 8, the method further comprising determining, for each of the one or more transmit antennas, one or more of a maximum delay spread of the wireless channel, a minimum delay spread of the wireless channel, an average delay spread of the wireless channel, and a root-mean-square delay of the wireless channel.

13. The non-transitory computer program product of claim 8, the method further comprising determining for each of the one or more transmit antennas, an estimate of a channel coherence bandwidth.

14. The non-transitory computer program product of claim 8, wherein iteratively finding significant delay taps of the intermediate channel impulse response estimate and adding the one or more significant delay taps to the error of the intermediate channel impulse response estimate is performed according to $$\hat{H}_k = \mu(\tilde{H}_0 - G\tilde{H}_{k-1}) + \tilde{H}_{k-1}$$
$$[MaxVal, Idx] = \max\left(\sum_{m=1}^{M}|\hat{H}_k(0,m)|^2, \ldots, \sum_{m=1}^{M}|\hat{H}_k(N_{CP},m)|^2\right)$$
$$\tilde{H}_k = zeros(N_{CP}+1, M)$$
$$\tilde{H}_k(Idx, m) = \hat{H}_k(Idx, m)\ m = 1, 2, \ldots, M$$

$$k = 1, 2, \ldots, N_{iter}$$

where M is a number of receive antennas; and G, $N_{iter}$, $N_{CP}$, and $\mu$ are predetermined, wherein G is $F^{Herm}F$, F is the one or more complex exponentials of the frequency domain least-squares channel estimate, $N_{iter}$ is a scalar, $N_{CP}$ is a length of cyclic prefix, $\mu$ is the non-negative error scaling factor, and Idx characterizes locations of the significant delay taps.

15. A system comprising:
at least one data processor;
memory storing instructions which, when executed by the at least one data processor, causes the at least one data processor to perform operations comprising:
receiving data characterizing a first signal transmitted in an orthogonal frequency-division multiplexing (OFDM) system by a transmitter with one or more transmit antennas through a wireless channel and received by a receiver with a plurality of receive antennas, the first signal comprising a plurality of pilot pulses;
determining a final estimated time-domain channel impulse response of the wireless channel for each pair of transmitter and receiver antennas by iteratively finding one or more significant delay taps of an intermediate time-domain channel impulse response estimate, calculating an error of the time-domain channel impulse response as a difference between an initial channel estimate and a scaled intermediate time-domain channel estimate, the intermediate time-domain channel impulse response estimate scaled by a product of a conjugate transpose of one or more complex exponentials of a frequency domain least-squares channel estimate and the one or more complex exponentials of the frequency domain least squares channel estimate, scaling the error by a non-negative factor, and feeding the scaled error of the intermediate time-domain channel impulse response estimate back to add to the one or more significant delay taps, the one or more significant delay taps forming entries in the intermediate time-domain channel estimate, wherein finding the one or more significant delay taps includes comparing, during an iteration, a plurality of entries in the intermediate channel impulse response estimate to a threshold; and
providing data characterizing the final estimated channel impulse response.

16. The system of claim 15, wherein the one or more significant delay taps are non-zero entries of the intermediate channel impulse response estimate.

17. The system of claim 15, the operations further comprising determining an estimate of a channel frequency response for a plurality of sub-carriers.

18. The system of claim 15, the operations further comprising determining an estimate of a length of a channel impulse response of the wireless channel.

19. The system of claim 15, the operations further comprising determining, for each of the one or more transmit antennas, one or more of a maximum delay spread of the wireless channel, a minimum delay spread of the wireless channel, an average delay spread of the wireless channel, and a root-mean-square delay of the wireless channel.

20. The system of claim 15, the operations further comprising determining for each of the one or more transmit antennas, an estimate of a channel coherence bandwidth.

* * * * *